United States Patent [19]

Morellato et al.

[11] Patent Number: 5,573,142
[45] Date of Patent: Nov. 12, 1996

[54] BOTTLED WATER DISPENSING CABINET

[75] Inventors: Paul J. Morellato, Cambridge; Don Terkalas, Brampton, both of Canada; Keith E. Carr, Pluderhausen, Germany

[73] Assignee: Whirlpool Corporation, Benton Harbor, Mich.

[21] Appl. No.: 323,872

[22] Filed: Oct. 17, 1994

[51] Int. Cl.⁶ .................................................. B67D 5/56
[52] U.S. Cl. .................... 222/129.1; 222/146.1; 222/153.13; 222/183; 62/395
[58] Field of Search .................... 222/51, 64, 67, 222/129.1, 183, 153.13, 146.1, 146.2, 146.5, 146.6, 144.5, 333; 239/135, 128; 141/82, 104; 62/394, 395; 137/571, 587

[56] References Cited

U.S. PATENT DOCUMENTS

| | | | |
|---|---|---|---|
| 2,704,657 | 3/1955 | Taylor | 257/241 |
| 2,711,252 | 6/1955 | Oliver | 137/571 |
| 2,781,648 | 2/1957 | Lyman | 62/141 |
| 2,784,879 | 3/1957 | Fischer | 222/146.1 |
| 3,269,143 | 8/1966 | Gasparovich | 62/389 |
| 3,312,083 | 4/1967 | Scoggins et al. | 62/390 |
| 3,333,438 | 8/1967 | Benua et al. | 62/395 |
| 3,363,432 | 1/1968 | Sholtes | 62/397 |
| 3,568,974 | 3/1971 | Delorme | 251/7 |
| 4,005,804 | 2/1977 | Dreibelbis | 222/146.1 |
| 4,007,856 | 2/1977 | Murphy et al. | 222/146.2 |
| 4,042,142 | 8/1977 | Ruano | 220/4 B |
| 4,207,994 | 6/1980 | Offlee, Sr. | 222/146 R |
| 4,520,950 | 6/1985 | Jeans | 222/129.1 |
| 4,549,675 | 10/1985 | Austin | 222/129.1 |
| 4,741,355 | 5/1988 | Credle, Jr. et al. | 137/269 |
| 4,792,059 | 12/1988 | Kerner et al. | 222/67 |
| 4,830,223 | 5/1989 | Priest | 222/146.6 |
| 4,848,097 | 7/1989 | Roberts | 62/135 |
| 4,852,621 | 8/1989 | Bear | 141/83 |
| 4,881,380 | 11/1989 | Mrugala et al. | 62/389 |
| 4,940,164 | 7/1990 | Hancock et al. | 222/66 |
| 4,958,747 | 9/1990 | Sheets | 222/67 |
| 4,987,746 | 1/1991 | Roberts | 62/137 |
| 5,017,284 | 5/1991 | Miler et al. | 210/97 |
| 5,042,689 | 8/1991 | Mrugala et al. | 222/67 |
| 5,063,977 | 11/1991 | Belland | 141/86 |
| 5,064,097 | 11/1991 | Brog et al. | 222/129 |
| 5,172,832 | 12/1992 | Rodriquez, Jr. et al. | 222/146.1 |
| 5,184,476 | 2/1993 | Desrosiers et al. | 62/389 |
| 5,192,004 | 3/1993 | Burrows | 222/146.1 |
| 5,254,243 | 10/1993 | Carr et al. | 210/94 |
| 5,287,913 | 2/1994 | Dunning et al. | 222/146.1 |
| 5,449,093 | 9/1995 | Burrows | 222/146.1 |

*Primary Examiner*—Andres Kashnikow
*Assistant Examiner*—Lisa Douglas
*Attorney, Agent, or Firm*—Hill, Steadman & Simpson

[57] ABSTRACT

A water dispensing apparatus having a cabinet providing a water bottle holding compartment having a deployable ramp to assist in loading an upright water bottle into the cabinet, a front mounted alcove with a paddle switch having a stepped outer surface to allow activation by small and large diameter containers, an electrical interlock switch for avoiding inadvertent dispensing of hot water, and a reserve tank having a low water level alarm switch activating a light annunciator and a vent check valve arrangement for venting the reserve tank during water flow. The cabinet is adapted to receive a filter unit in lieu of a water bottle.

16 Claims, 15 Drawing Sheets

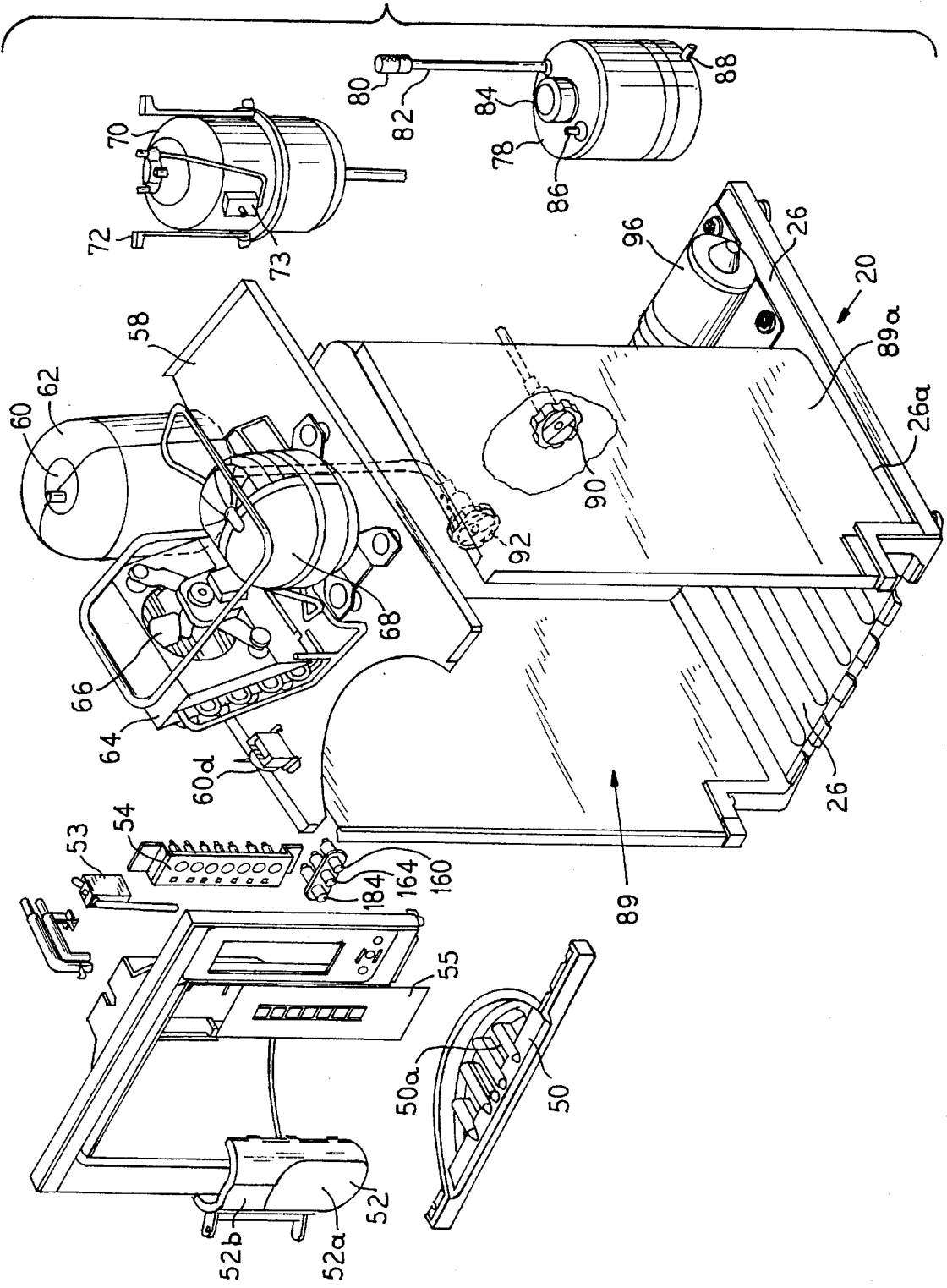

BOTTLED WATER DISPENSING CABINET

BACKGROUND OF THE INVENTION

The present invention relates to a dispensing apparatus and system for dispensing liquids, particularly for dispensing water for drinking, cooking and otherwise consuming.

Self-contained cabinets for holding bottled water incorporating a dispensing nozzle are known as described in U.S. Pat. Nos. 4,881,380 and 5,042,689. These references describe cabinets having upright standing bottles located in a lower compartment with a pump for extracting water and passing the water through hot and cold water tanks via tubing. These patents describe cooling condensers which are large and exposed on a backside of the cabinets such as shown in FIG. 33 of either reference. Additionally, U.S. Pat. No. 5,042,689 describes a water bottle vent arrangement connected directly to the supply water bottle via a tube. A pressure switch 274 is connected via a pressure tube 278 into the primary water supply bottle also. According to this reference, three separate service connections are made to the water supply bottle: the vent tube, the pressure switch tube, and the water draw to the water supply pump. The connections can be made through a single, but complex, wand.

U.S. Pat. No. 4,881,380 discloses a mechanical safety latch to prevent children from being able to operate the water dispensing push button.

Dispensing apparatus for filtering domestic water are generally known such as U.S. Pat. No. 4,946,599, U.S. Pat. No. 5,064,097 and U.S. Pat. No. 5,254,243. It is not known to provide water filtration and purifying apparatus within a cabinet accessible from a front side thereof, wherein the cabinet provides water refrigerating and heating equipment conveniently arranged above the filtration equipment. It is not known to provide in easily modifiable form, a cabinet system for holding an upright water bottle which can be simply modified to hold water filtration equipment in lieu thereof for connection to the domestic water supply, both applications having refrigeration and heating equipment mounted in an upper portion of the cabinet.

SUMMARY OF THE INVENTION

The present invention provides a cabinet for enclosing a bottled water supply system or filtered water system which can be freestanding or installed in conjunction with existing cabinetry. The water dispenser provides a lower cabinet compartment for receiving an upright water bottle with an upward directed nozzle or for receiving filtering equipment for domestic water. A refrigeration tray is arranged above the lower cabinet compartment and holds a cold water tank with enclosed evaporator, a compressor, and a folded condensing tube having a convection air fan associated therewith. A hot water container is supported from the refrigeration tray which has an electrical heating element associated therein for producing hot water for coffee, tea, or other hot water applications. For the bottled water application, a reserve tank is provided which receives water from the primary water bottle via a tube and which has an elevated vent associated therewith.

The invention provides a novel two-level, offset paddle switch for press activation by a small diameter drinking glass or alternately by a wide diameter pan which enables the water being dispensed to enter the glass or pan away from the pressing edge thereof to prevent spilling or splashing and provides a more accessible visual path for monitoring the filling of the container. The invention provides a removable drip tray beneath the dispensing area for ease of cleaning and maintenance.

The invention provides a safety lock-out feature which electrically prevents inadvertent selection, and immediate dispensing of hot water to prevent accidental scalding. The invention provides a control system which maintains the sealed integrity of water bottles and tanks as well as ensures continuous and smooth dispensing of water. The invention provides easily accessible drain valves for removing all water from the cooling and heating tanks for periodic flushing and draining or for moving the unit.

The invention provides an overall compact arrangement of refrigeration section, heating section and reserve tank (as applicable) in a compact economically manufactured and easily assembled cabinet for installation in the home, office or elsewhere. The cabinetry is easily manufactured for both bottled and filtered water applications.

The invention provides that different types water filtration and purifying systems can be employed in the lower cabinet compartment. In this way, manufacturing of the cabinet can be somewhat standardized in size and structure. Additionally, the invention provides for a filtered water unit using filter canisters and/or a reverse osmosis unit contained behind a front door for maintenance and replacing as well as a refrigeration shelf for holding mechanical refrigeration equipment above the lower cabinet compartment. The heating tank for hot water can be hung from the refrigeration tray.

An alcove for dispensing water is provided for the filtered water unit having the two tiered contoured paddle for both drinking glass and pan filling. Additionally, the hot water tank and the cold water tank can be drained from a front side of the cabinet and a safety interlock switch can be provided for preventing inadvertent and immediate dispensing of hot water to prevent scalding. A hinged ramp is provided at a front of the lower cabinet compartment for loading water bottles or filtering equipment.

BRIEF DESCRIPTION OF THE DRAWINGS

FIG. 2 is an exploded partial view of the water cabinet of FIG. 1;

DETAILED DESCRIPTION OF THE PREFERRED EMBODIMENTS

Figure 1:
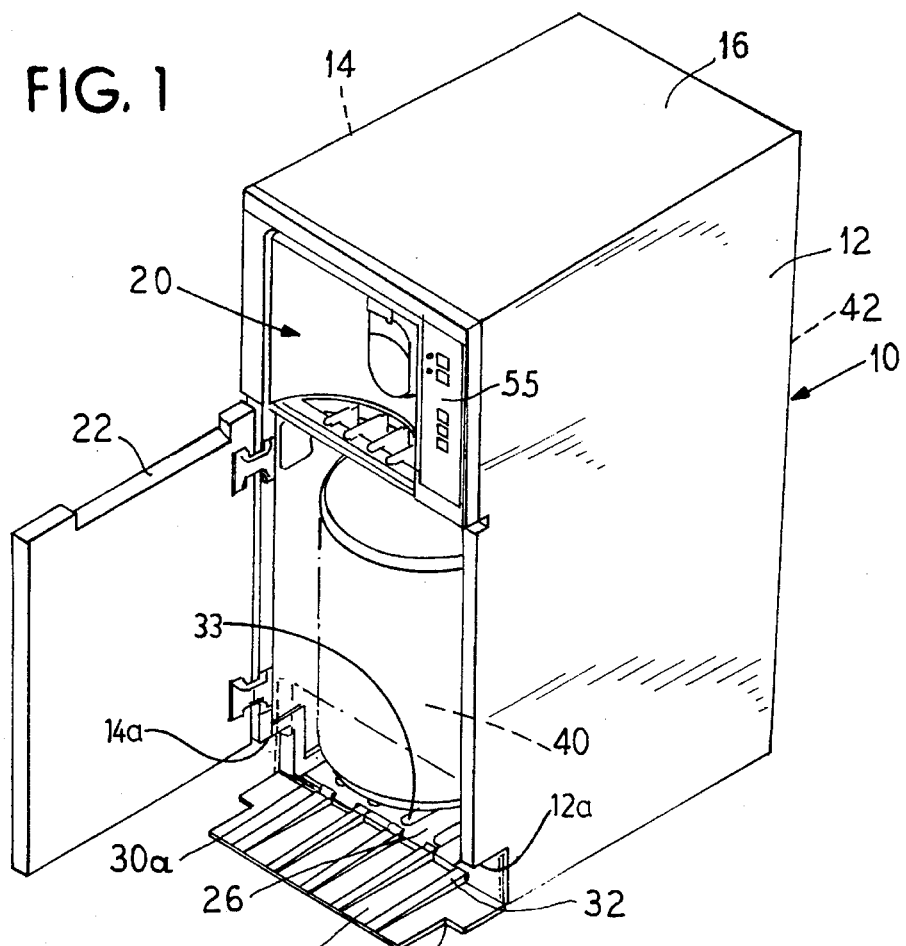
FIG. 1 is a perspective view of a water dispensing cabinet of the present invention.

FIG. 1 illustrates a water dispensing cabinet 10 of the present invention. The cabinet 10 provides surrounding side panels 12, 14, a top panel 16, an alcove 20 and a front door 22 hinged to the side panel 14 or 12. The unit can be freestanding or built-in. A plastic structural foam base is provided within the cabinet 10. A hinged ramp 30 is provided pivotably connected along a hinge axle 30a to the base 26 and having inclined ramp elements 32 leading up to a raised floor 33 for the cabinet. The ramp 30 can be folded up to the dashed position when not in use to form a toe recess wall of the cabinet. The ramp 30 has notched side walls 30b which interfit into notches 12a, 14a of the cabinet walls 12, 14 when pivoted upwardly and detentes hold the ramp in the vertical orientation. This hinged ramp 30 assists in sliding a water bottle 40 into the cabinet. A rear panel 42 can be provided if needed.

FIG. 2 shows a partial exploded view of the apparatus shown in FIG. 1. The unit provides a removable drip tray 50 for locating into the alcove 20. The drip tray has recesses 50a to hold water thereon. Unlike grids over trays, this formed drip tray gives visual indication of retained water to indicate the need for cleaning. This drip tray can be conveniently removed from the alcove 20 for cleaning. A contoured paddle 52 is provided for initiating dispensing of water. The paddle has two tiers, a lower tier 52a for dispensing water into a large container and an upper raised tier 52b for dispensing water into a smaller container such as a drinking glass as described below and shown in FIGS. 7a, 7b. The paddle closes a paddle switch 53. A selector switch 54 having a plurality of selector buttons 54a, 54b and 54c are provided within a selector panel 55 to select cold water, hot water or room temperature water respectively.

The unit provides a refrigeration tray 58 upon which is mounted a cold water supply tank 60 having an evaporator inside and covered by insulation 62. Also mounted on the tray is an air cooled condenser coil 64 associated with an electrically driven fan 66 which draws or blows air across the coil. Unlike the free convecting condensers of the prior art, this arrangement allows for a compact design with less consideration for the free flow of convection air which would be a concern for built-in units. A compressor 68 is provided and along with an expansion valve (not shown) completes the mechanical refrigeration circuit elements.

A hot water supply tank 70 having a thermal element 71 (not shown) thereon is provided with brackets 72 for hanging the hot water tank from the refrigeration shelf 58. The hot water tank 70 provides a hot water thermostat 73 for regulating hot water temperature. A reserve tank 78 is provided having an elevated air check valve 80 connected by a tube 82 to the reserve tank 78. A float switch 84 is connected at a top of the reserve tank and proceeds down into the tank. An inlet 86 and an outlet 88 are provided for the reserve tank 78. The float switch 84 triggers an empty bottle warning light described below. An inherent problem with inside cabinet water bottles is that the water bottle is out of sight as contrasted with the inverted bottle dispensers. Without visual contact the user is not often aware of when the bottle approaches being empty. The reserve tank of the present invention provides the warning plus provides a reserve supply of water until ultimate water depletion of the dispenser.

The reserve tank can take any shape which is compatible with the cabinetry. The reserve tank inlet 86 can be at nearly any elevation on the reserve tank. A top inlet is shown. The outlet 88 should be at the bottom of the tank. The air vent tubing 82 extends upwardly to hold the check valve 80 at an elevation above the top of the bottle 40 or at least above a maximum water level in the bottle 40.

FIG. 2 illustrates the cabinet 10 having the side walls 12, 14 and top 16 removed for clarity. A water bottle compartment 89 is formed by a U-shaped wall 89a.

A hot water drain valve 90 and a cold water drain valve 92 are provided protruding into the water bottle compartment 89 for draining the hot water tank and cold water tank from a front side of the cabinet 10. This is especially useful when the cabinet 10 is a built-in unit which cannot be readily serviced from a backside. A water pump 96 is provided bolted to a backside of the base 26.

Figure 3:
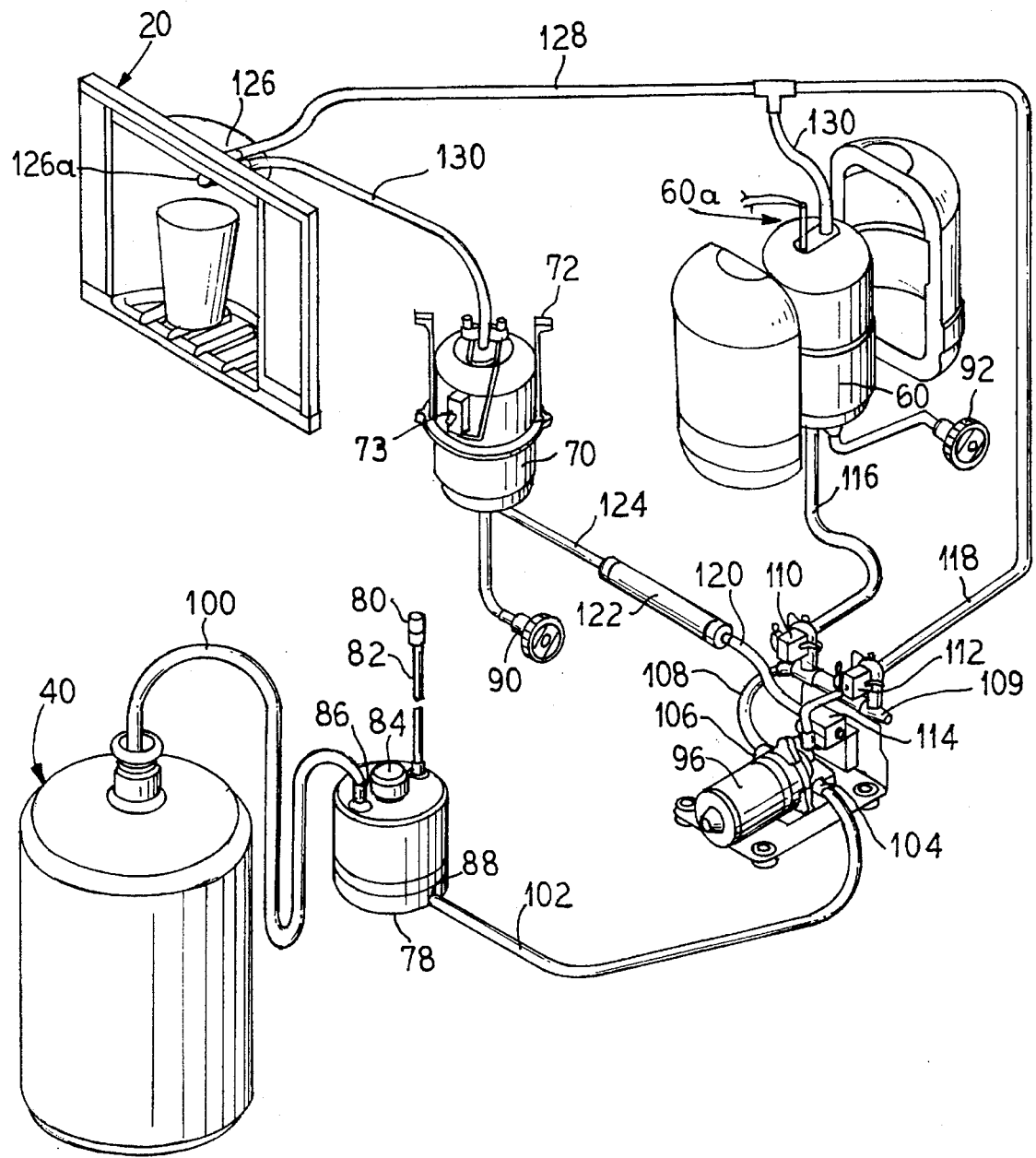
FIG. 3 is a schematic flow drawing of the components of the water cabinet of FIG. 1.

FIG. 3 illustrates the flow system of the present invention. The water bottle 40 is connected by tube 100 to the reserve tank inlet 86. A second tube 102 connects the outlet 88 to the pump 96 at an inlet 104 thereof. The pump elevates the pressure of the water to an outlet 106 where it passes through a third tube 108 into an inlet manifold 109 serving three solenoid valves: cold water solenoid valve 110, room temperature water solenoid valve 112, and hot water solenoid valve 114, all flow connected on their inlet side to the outlet 106 of the pump. The cold water solenoid valve 110 passes water via a fourth tube 116 to the cold water tank 60. The room temperature water solenoid valve 112 passes water via a fifth tube 118 to the alcove 20. The hot water solenoid valve 114 passes water through a sixth tube 120 to an aspirator 122 whereupon it flows through a seventh tube 124 to the hot water tank 70.

An outlet manifold 126 is provided at the alcove 20. This manifold 126 receives flow from a common tube 128 receiving flow from an outlet tube 130 from the cold water tank 60 and the fifth tube 118. The manifold also receives hot water from a hot water tube 130 from the hot water tank 70.

Figure 4:
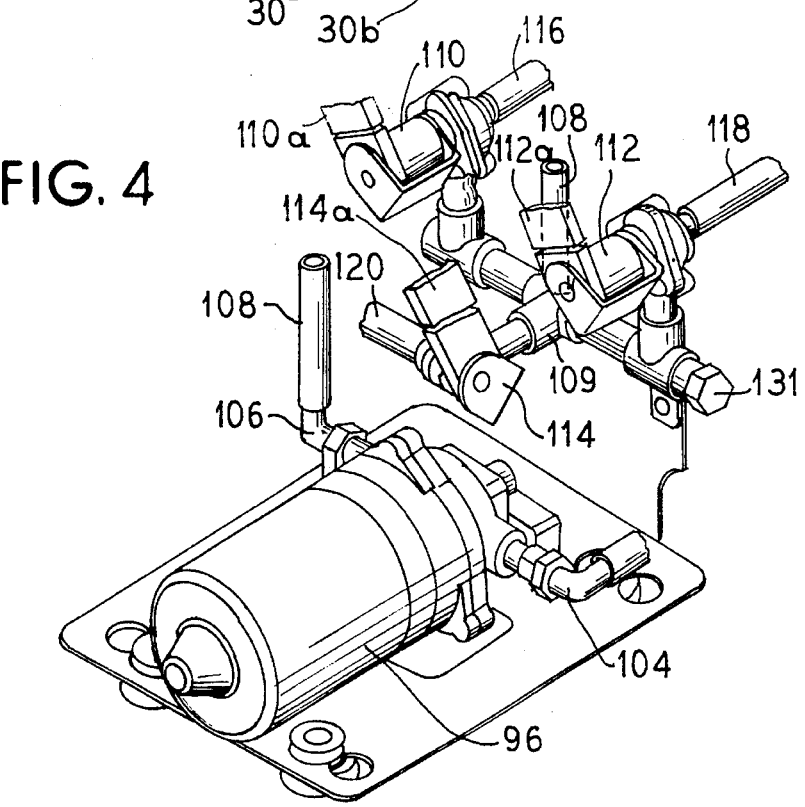
FIG. 4 is a partial perspective view of a pump and solenoid valve manifold arrangement of the apparatus of FIG. 1.

FIG. 4 shows the valve arrangement comprising the cold water solenoid valve 110, the room temperature water solenoid valve 112 and the hot water solenoid valve 114 having inlets manifolded together by the tube manifold 109 and outlets serving the three different water functions. The manifold 109 can be plastic injection molded for strength and compactness. A remote service port 131 can be connected to a tube (not shown) to serve a remote service such as an ice maker. Electrical connectors 110a, 112a, 114a connect the solenoid valves to appropriate control circuit wiring (not shown).

Figure 5:
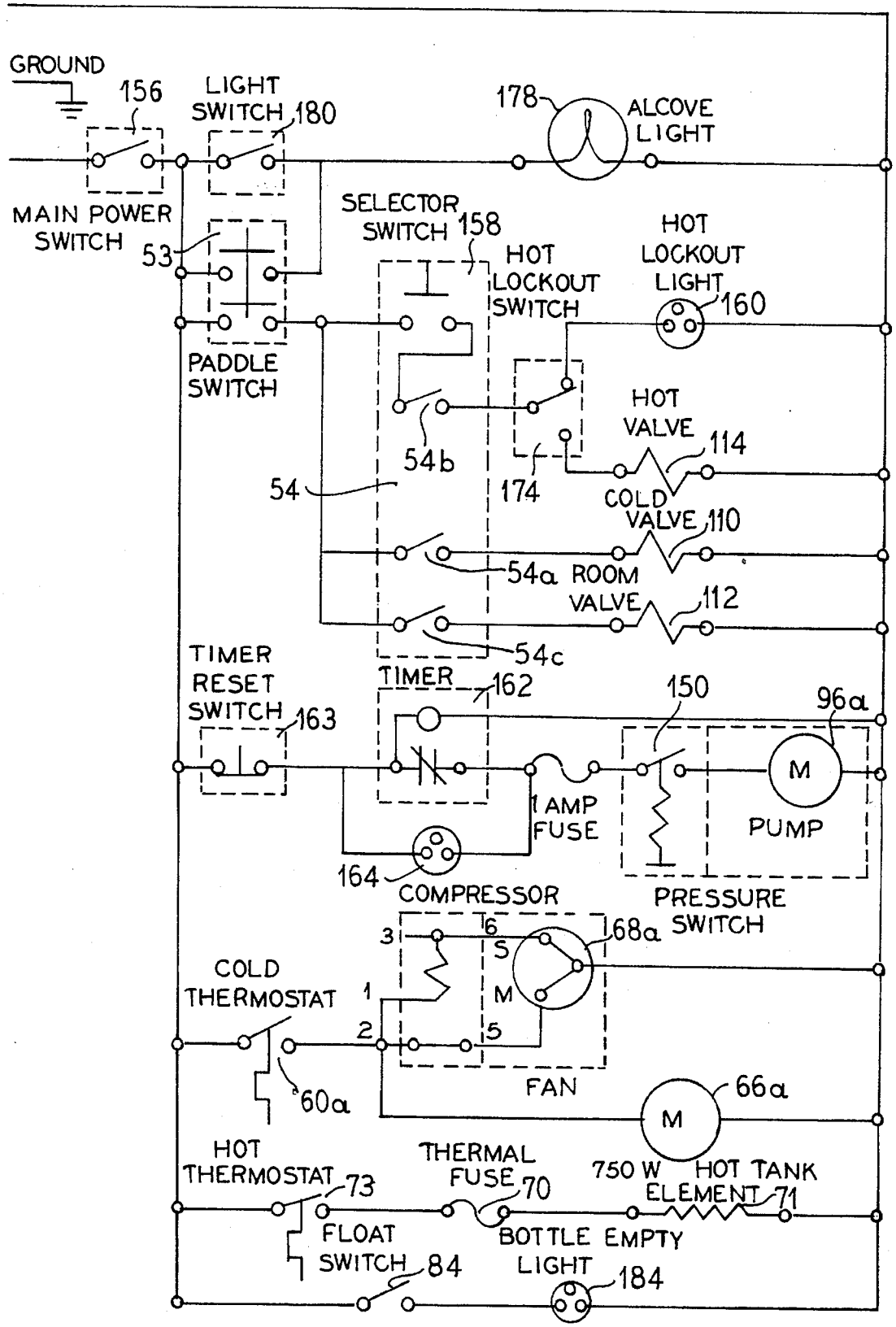
FIG. 5 is an electrical schematic diagram of the control system of the apparatus of FIG. 1.

FIG. 5 illustrates the control system for the bottled water dispenser. The unit operates as follows:

1) An appropriate selector button from the buttons 54a, 54b, 54c is pressed for either cold water, hot water, or room water which allows for the selected solenoid valve 110, 114 or 112 to be opened.

2) A container such as a drinking glass or a pan is pressed against the alcove paddle 52 which closes the paddle switch 53, which energizes the selected solenoid valve, if cold water or room temperature water is selected, i.e., solenoid valves 110, 112. If hot water is selected the hot water solenoid valve does not open immediately. When hot water is selected, an additional momentary button (switch 158) must be pressed in order to dispense water. This is a safety feature to prevent inadvertent selection and immediate dispensing of hot water. This feature is especially advantageous to prevent children from tampering with the paddle 52 and scalding themselves as it requires two hand operation.

3) The selected energized solenoid valve allows water pressure on the pump side of the manifold to push water through that valve causing a pressure drop on the pump side of the manifold 109. The pressure drop causes a pump pressure switch 150 to close and energize a pump motor 96a for the pump 96.

4) The pump 96 draws water from the bottle of water 40, through the reserve tank 78 and into the manifold 109 where the appropriate open valve allows water to be passed through the selected tank 60, 70 or passed directly into a water spout 126a from the discharge manifold 126.

5) When the alcove paddle 52 is released, the selected solenoid valve is deenergized and closes. The pump continues to operate until the water pressure between the pump and the manifold reaches the shut off pressure of the pump pressure switch 150. The pump motor is then deenergized.

6) Water is drawn from the reserve tank 78 which is vented to the atmosphere with the check valve 80. The pump 96 is typically a positive displacement pump. A vacuum is created in the reserve tank 78 and tubing which allows syphoning from the water bottle 40 to the reserve tank 78 and pump 96. This syphoning action fills the reserve tank 78. The water level switch 84 energizes an indicator light when the water level in the reserve tank drops to a select level. The air check valve 80 is adjusted to allow air to exit the reserve tank to maintain the syphon. The system allows water to be fully drained from the water bottle 40 while maintaining a constant level in the reserve tank.

The cold tank 60 and hot tank 70 are at atmospheric pressure. The only significantly pressurized area of the system is from the outlet of the pump 96 to the outlet of the manifold 109.

The cold tank 60 can be a stainless steel tank with a thermostat well 60a. Water is introduced into the bottom of the tank through the cold valve and exits through the top of the tank. The thermostat well 60a is a sealed tube which accepts a hydraulic thermostat to monitor the water temperature and control the cooling system.

The cooling system is controlled by the adjustable hydraulic thermostat 60a. The water temperature is sensed by a thermostat lead 60b such as a thermocouple or other thermal sensing device which is located in a thermal well 60c inside the cold tank 60. When the thermostat senses temperature above the preselected water temperature, a thermostat switch 60d closes, supplying power to a compressor motor 68a for the compressor 68 and fan motor 66a for the fan 66.

Water enters the hot tank system from the hot water valve 114, through the "aspirator" or "displacer" 122 and into the bottom of the tank 70. Hot water exits through the top of the tank 70 to the spout 126a. The displacer is a low velocity venturi system which draws water into itself after the valve 114 is closed. This creates an air dome in the top of the hot tank, thus creating room for thermal expansion of the water and preventing dripping of hot water out of the spout 126a. The hot tank is a modified Kitchenaid Insta-Hot System™.

The hot and cold reservoirs can be conveniently drained and flushed from the front of the unit using the drain ports 90, 92 positioned inside the cabinet. The system is equipped with a main power switch 156 which disconnects the unit from power.

In order to dispense hot water, an additional safety switch, a hot lock out switch 174, must be closed. Lock out switch 174 is in series with the hot valve 114. When this switch 174 is closed hot water can be dispensed, but when it is open the valve 114 is disabled and hot water cannot be dispensed. An indicator light 160 is energized when the hot lock out is active. To dispense water the selector switch 54b must be pressed and then the momentary safety switch 158 must be pressed simultaneous with the paddle 52, requiring a two hand operation, helping to prevent inadvertent dispensing of hot water.

The pump is protected from extended running by a timer 162 which is activated when the pump motor is energized and reset by a reset switch 163 whenever the pump motor 96a is deenergized. An indicator light 164 is energized when the timer cuts power to the pump motor.

The hot water system is controlled by the adjustable thermostat 73, which is in thermal contact with the hot tank. The thermostat cycles at its selected temperature and energizes the heating element 71 submerged in the water in the tank. The hot water electrical system is protected from overheating or thermostat failure by a thermal fuse 170, which is in series with the system power. The thermal fuse will open when a preselected temperature is sensed.

Figure 6:
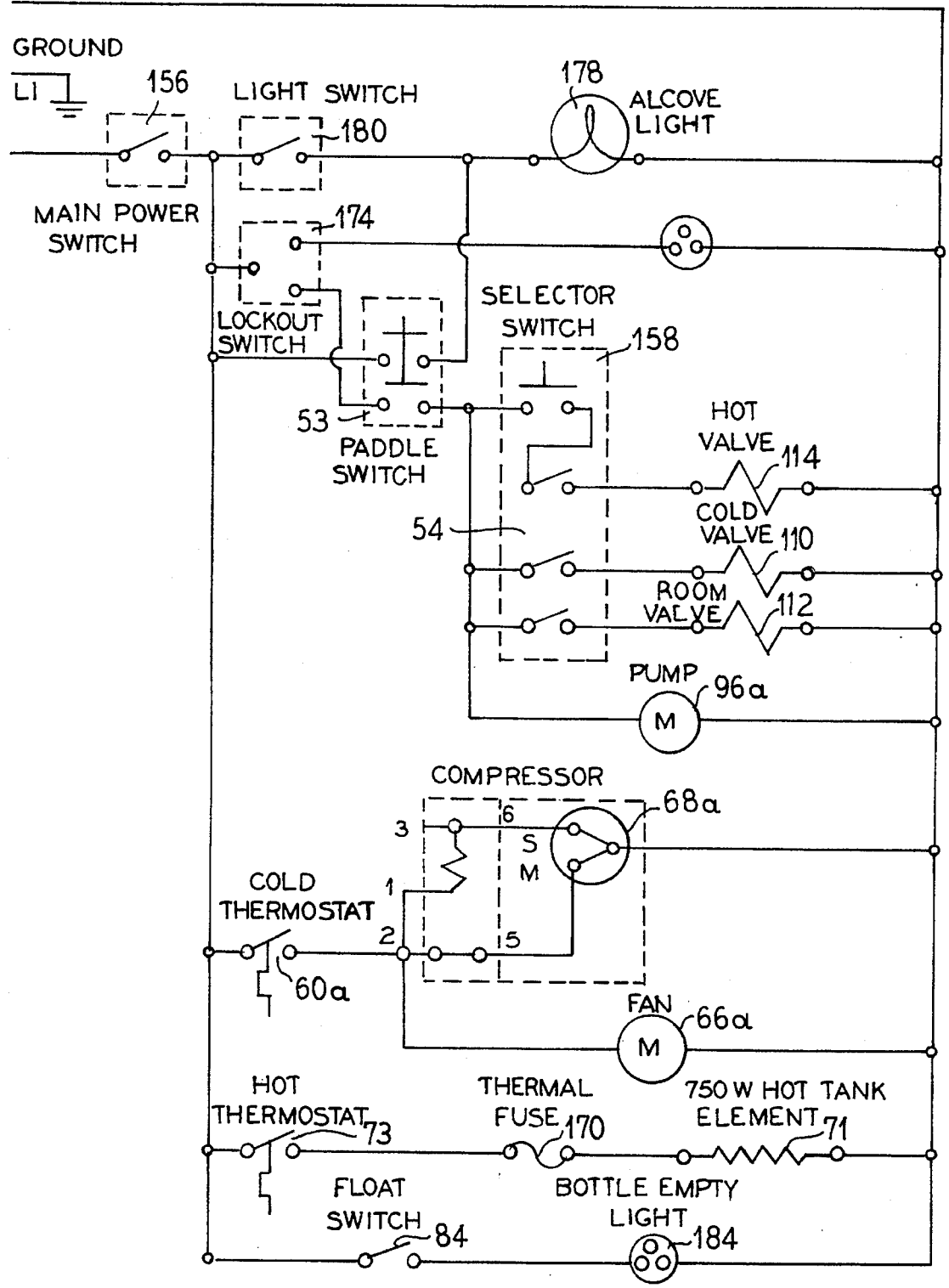
FIG. 6 is an alternate control schematic of the apparatus of FIG. 1.

As an alternate design, shown in FIG. 6, a system without a pressure switch on the pump can be used. In this circuit, the pump motor 96a is wired in series with the paddle switch 53, and in parallel with the dispensing valves 110, 112, 114. When the paddle is depressed, the paddle switch 53 closes, the selected valve solenoid 110, 112, 114 and the pump motor 96a are energized simultaneously. A system lock out can be achieved by placing a lock out switch 174 in series with the dispensing valves. When this switch is open the valve solenoids 110, 112, 114 are disabled.

In this system, once the system is charged with water the unit operates as follows:

1) The appropriate selector button is pressed (room, cold or hot), allowing for the correct solenoid valve 110, 112, 114 to be opened.

2) A suitable container is pressed against the alcove paddle 52, this closes the switch 53, if the lock out switch 174 is closed, the switch 53 energizes the appropriate solenoid valve 110, 112, 114 and the pump motor 96a. The pump draws water from the bottled water, through the reserve tank and into the manifold, where the appropriate open valve allows water to be pushed through the selected tank, or directly, to the water spout 126a. A momentary switch 158 can still be used for hot water dispensing.

3) When the alcove paddle 52 is released, the solenoid valve and the pump motor are deenergized thus stopping water flow.

In addition, an alcove light 178 can be wired to illuminate constantly by means of an alcove light switch 180, or upon activation of the paddle switch 53. Also, the float switch 84 in the reserve tank can be used to energize a bottle empty light 184, indicating to the user to change out the water bottle 40.

Figure 7:
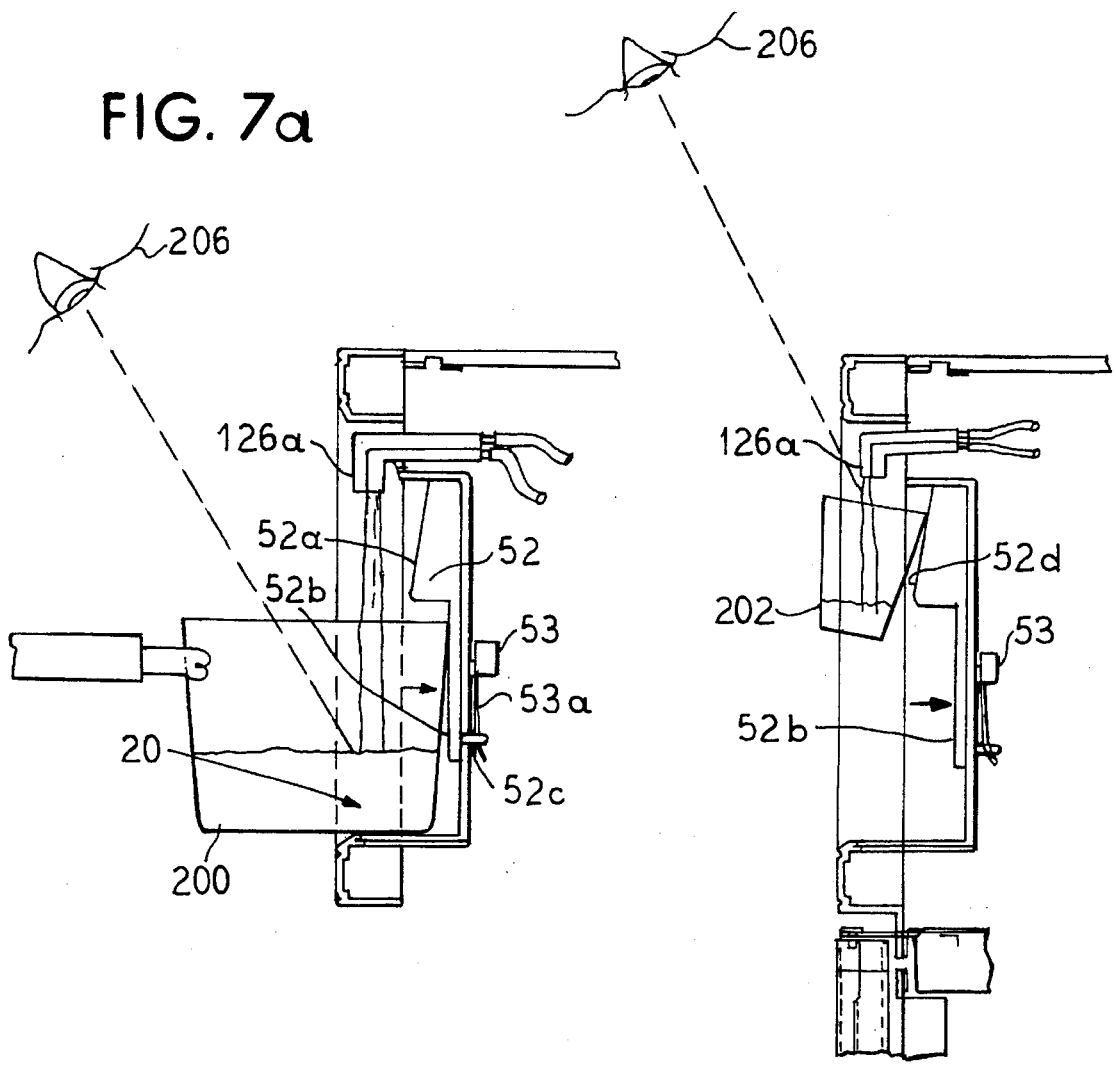
FIGS. 7a and 7b are partial sectional views of the apparatus of FIG. 1 showing different operating conditions.

FIGS. 7a and 7b illustrate the advantages of the contoured paddle 52. The paddle 52 is hinged on its side (not shown)

to substantially pass inwardly upon inward contact pressure from a pan 200 or a drinking glass 202. The paddle switch 53 is mounted behind the paddle 52 and has a contact wiper 53a which is deflected by a presser fork 52c attached to the paddle 52. The wiper 53a is thus deflected inwardly to close the switch 53. The top surface 52a provides a convenient pressing location for the drinking glass 202 which extends an approximate center portion of the drinking glass under the dispensing spout 126a. The bottom surface 52b likewise locates a wide central area of the pan 200 beneath the spout 126a. Particularly with regard to the pan 200, the recessed area 52b allows more room between the dispensing spout 126a and the pan 200 for a user 206 to observe the amount of water being collected in the pan 200. The alcove 20 is sized and shaped to allow a sufficient width pan 200 to proceed thereinto.

Figure 8:
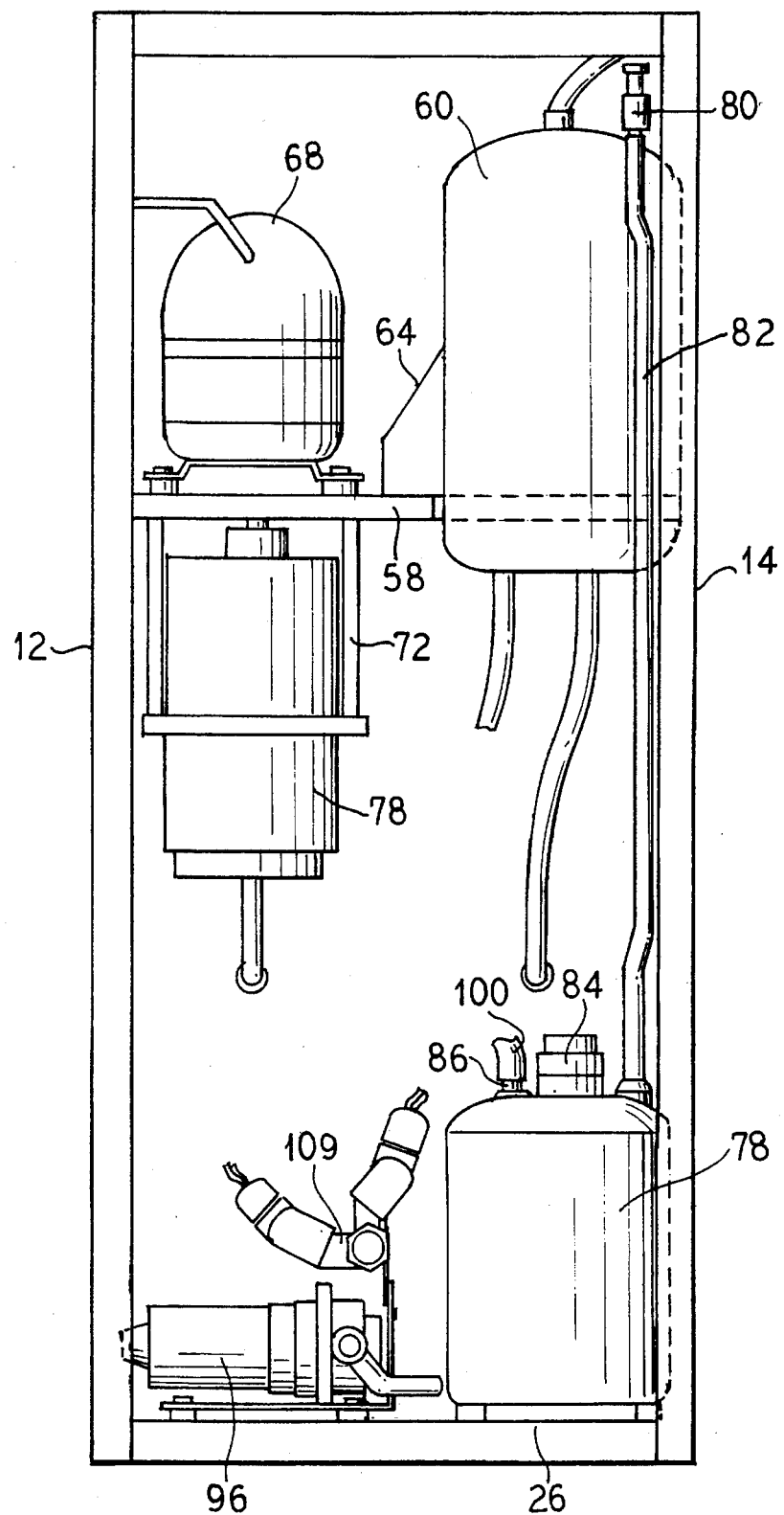
FIG. 8 is a rear elevational view of the cabinet of FIG. 1.

FIG. 8 demonstrates the compact arrangement of the apparatus. The pump 96 and reserve tank are located behind the bottle compartment 89 on the base 26. The hot water tank 78 is hung by brackets 72 from the refrigeration shelf which supports the compressor 68, condenser 64 and cold water tank 60. The vent tube 82 from the reserve tank 78 can be routed against and guided from the side wall 14 to an elevated position of the check valve 80.

The cabinet of the present invention including the components therein is readily manufactured and assembled. The base 26 and ramp 30 can be plastic structural foam to provide the raised contours and for strength. The bottle compartment wall 89a is advantageously formed by a bowed piece of sheet metal. The refrigeration tray can be metal and attached to the walls 12, 14 and 89a. The wall 89a sets into a groove formation 26a formed in the base 26. The side panels 12, 14 and top 16 and rear panel 42 can be sheet metal. The door 22, the alcove 20 including the selector panel 55, and the drip tray 50 can be plastic.

Figure 9:
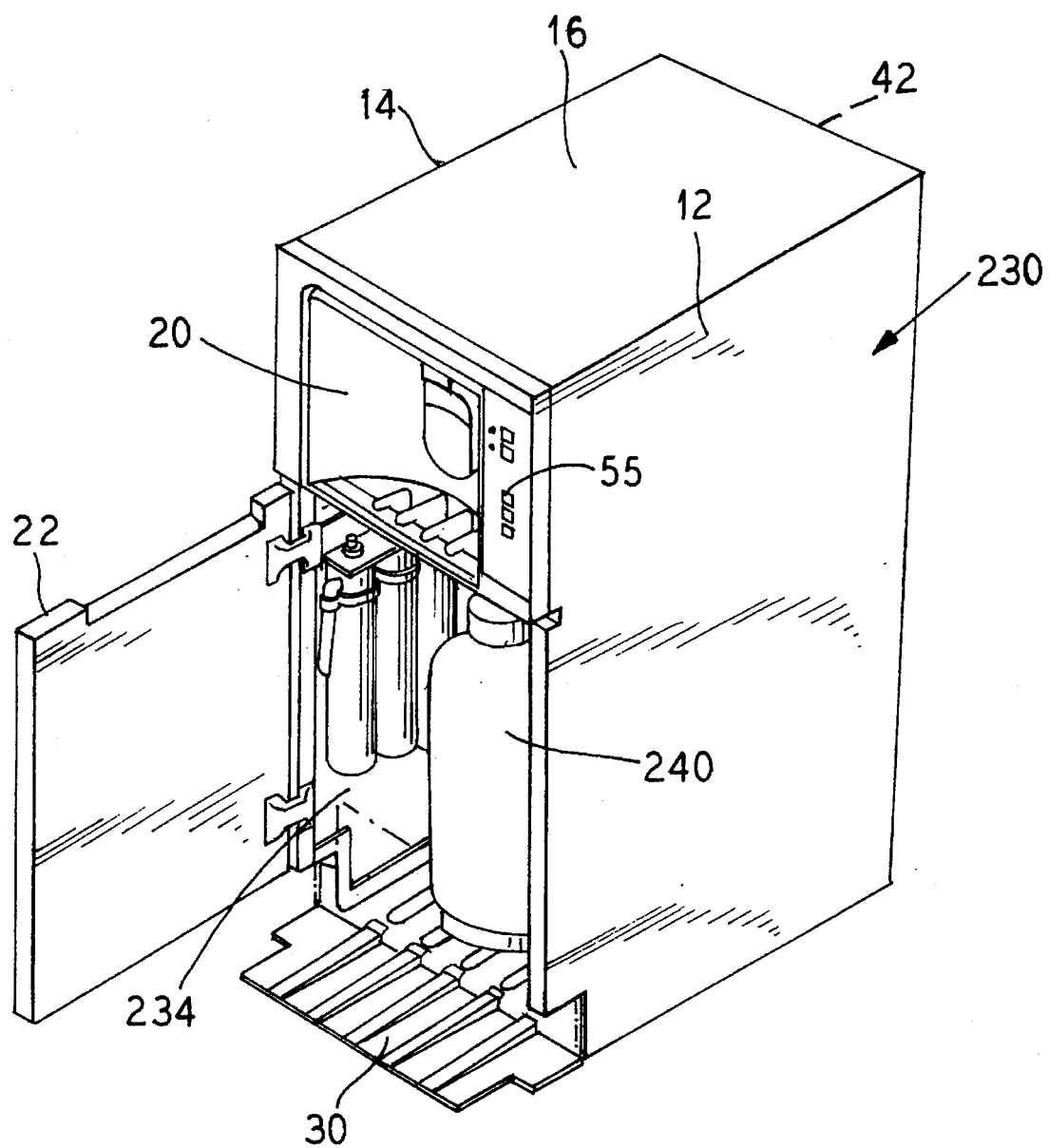
FIG. 9 is a perspective view of a filtered water cabinet according to the present invention using a reverse osmosis filter.

FIG. 9 illustrates another embodiment of the invention wherein a bottle of purified water 40 is replaced with a water purification and/or filtering system. A cabinet 230 identical in most respects to the cabinet 10 of FIG. 1 is provided. The cabinet 230 has a filter compartment 234 located behind the door 22. Inside the compartment 234 are mounted components which make up a reverse osmosis water treatment system such as disclosed in U.S. Pat. No. 5,254,243 and U.S. Pat. No. 5,017,284, herein incorporated by reference. The alcove 20, the ramp 30, the side walls 12, 14, 16 and the back 42 can all be identical to that described in FIG. 1.

Figure 10:
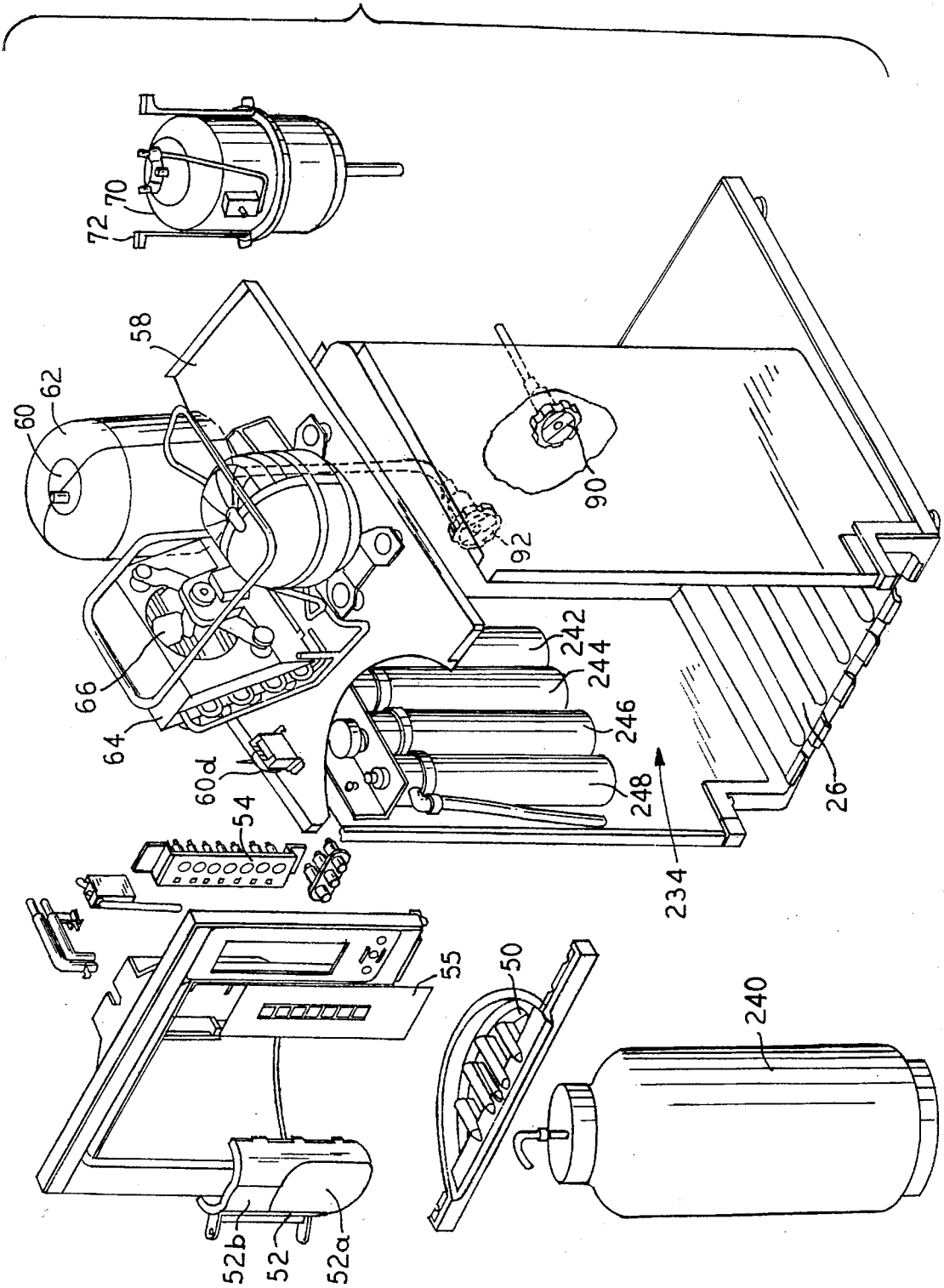
FIG. 10 is a partial exploded perspective view of the apparatus of FIG. 9.

FIG. 10 shows the filtering system in more detail including a bladder tank 240, a sediment filter 242, a first carbon filter 244, a reverse osmosis filter 246 and a second carbon filter 248. According to FIG. 11, domestic water is fed into a system inlet tube 250 where it proceeds through the sediment filter 242, through the carbon filter 244, through the reverse osmosis filter 246, and thereafter to the bladder tank 240 and second carbon filter 248 in parallel. Water exits the second carbon filter 248 through a supply tube 254 to the valve manifold 109. Depending on the selection made, water thereafter passes through either the room temperature water valve 112, the cold water valve 110, or the hot water valve 114. The filters 242, 244, 246, 248 are held in a row from a bracket 260 by individual bayonet connectors 262 which also provide the series pipe connections between filters. The reverse osmosis filter 246 provides a drain 264. The bracket 260 provides two mounting holes 266 which engage hanger screws on the inside wall 89a which allow easy installation and removal of all filters as a unit.

Figure 12:
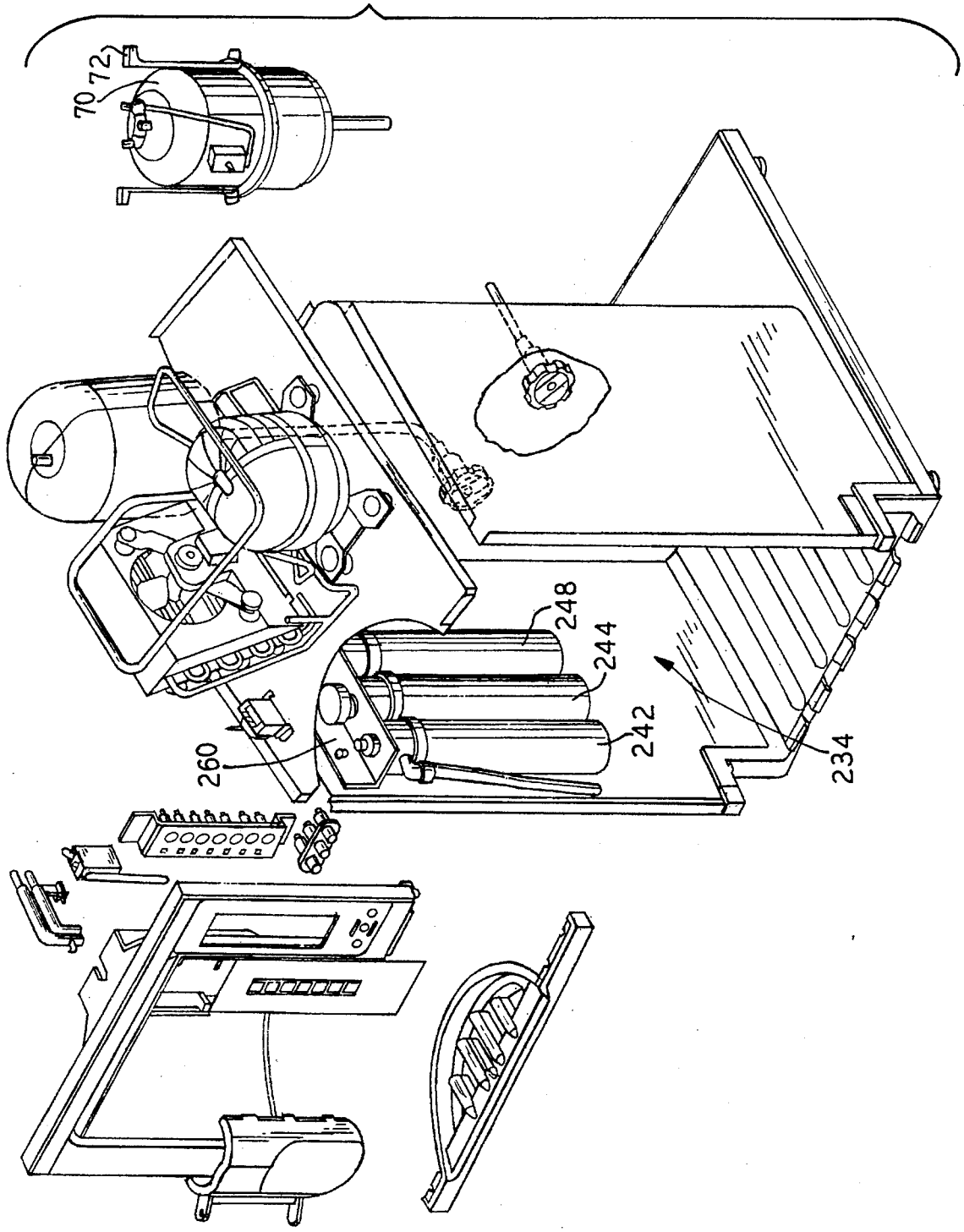
FIG. 12 is a partial exploded perspective of an alternate filtering apparatus of the present invention.

FIG. 12 illustrates a further embodiment of the invention wherein the reverse osmosis system is replaced by a filter cartridge system such as carbon filters 244, 248 and a sediment filter 242. The water inlet 250 is piped to the sediment filter 242 which then passes in series through the carbon filters 244, 248. Other type filters can be used in lieu of these particular filters, designed for treating the particular water quality, such as a lead reduction filter.

The filters 242, 244, 248 are mounted using the bracket 260 to an inside wall 89a of the filter area 234. The system of FIG. 13 operates in the same manner as the system of FIG. 11 in that the water passes through the selected solenoid valve and into either the hot tank 70, the cold tank 60 or directly as room temperature water to the spout 126a.

Figure 11:
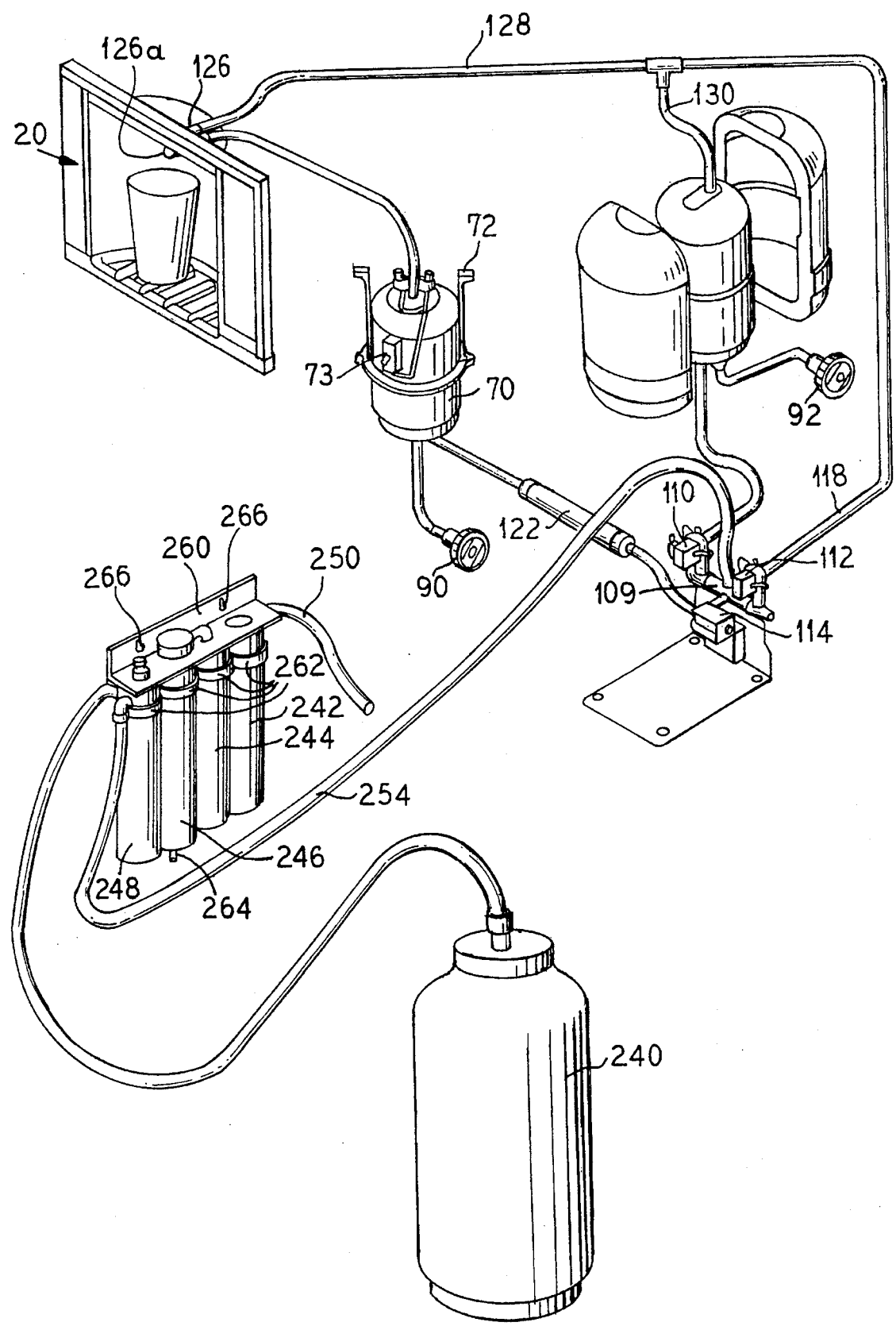
FIG. 11 is a perspective flow diagram of the apparatus of FIG. 9.
Figure 13:
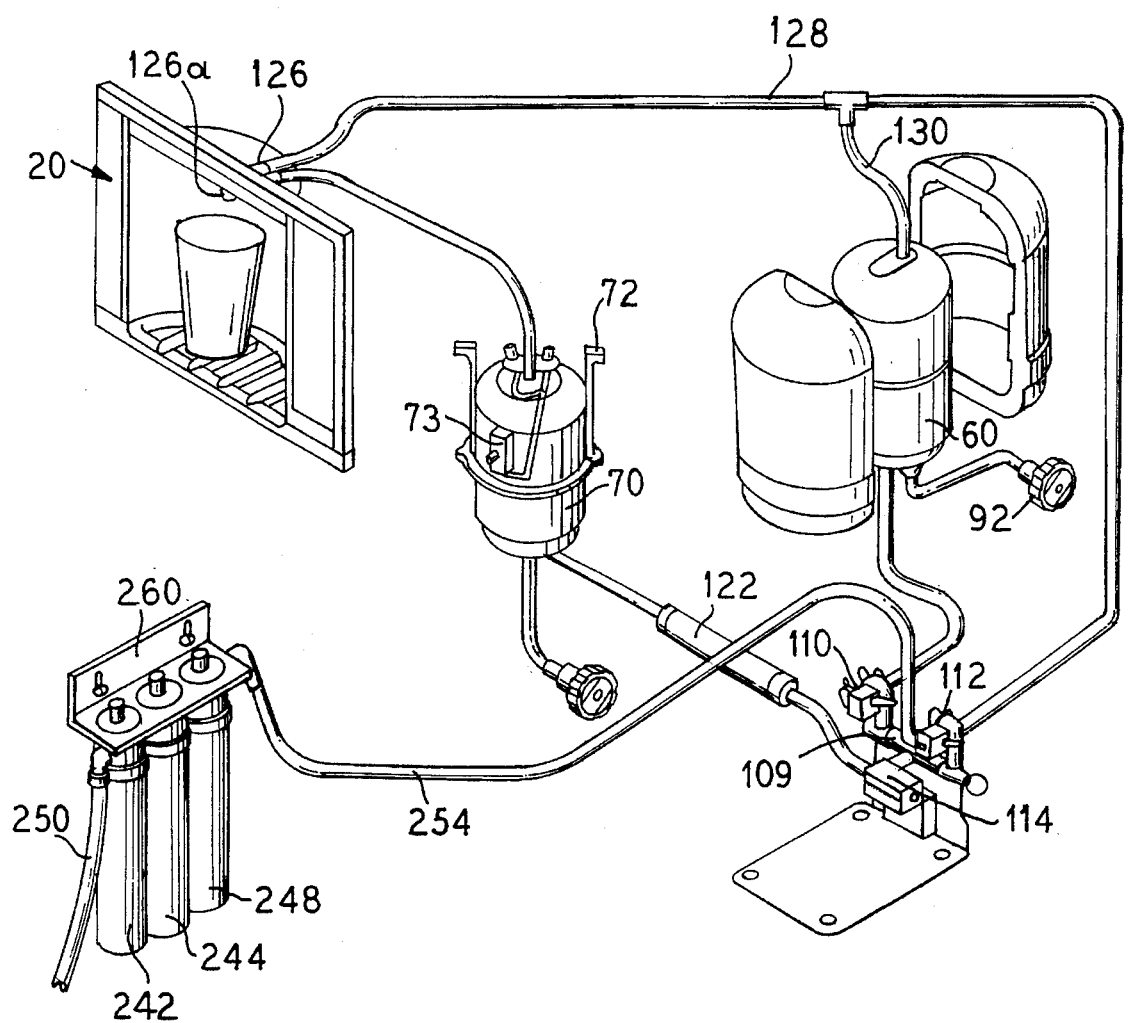
FIG. 13 is a flow diagram of the apparatus of FIG. 12.

For both the system of FIG. 11 and the system of FIG. 13, the cabinet designed for the refrigeration and heating circuits as well as the lay out of components and structure such as the alcove and the cabinetry is nearly identical to that shown in FIGS. 1 and 2, except that in the filtered water systems, no pump or reserve tank need be provided.

Figure 14:
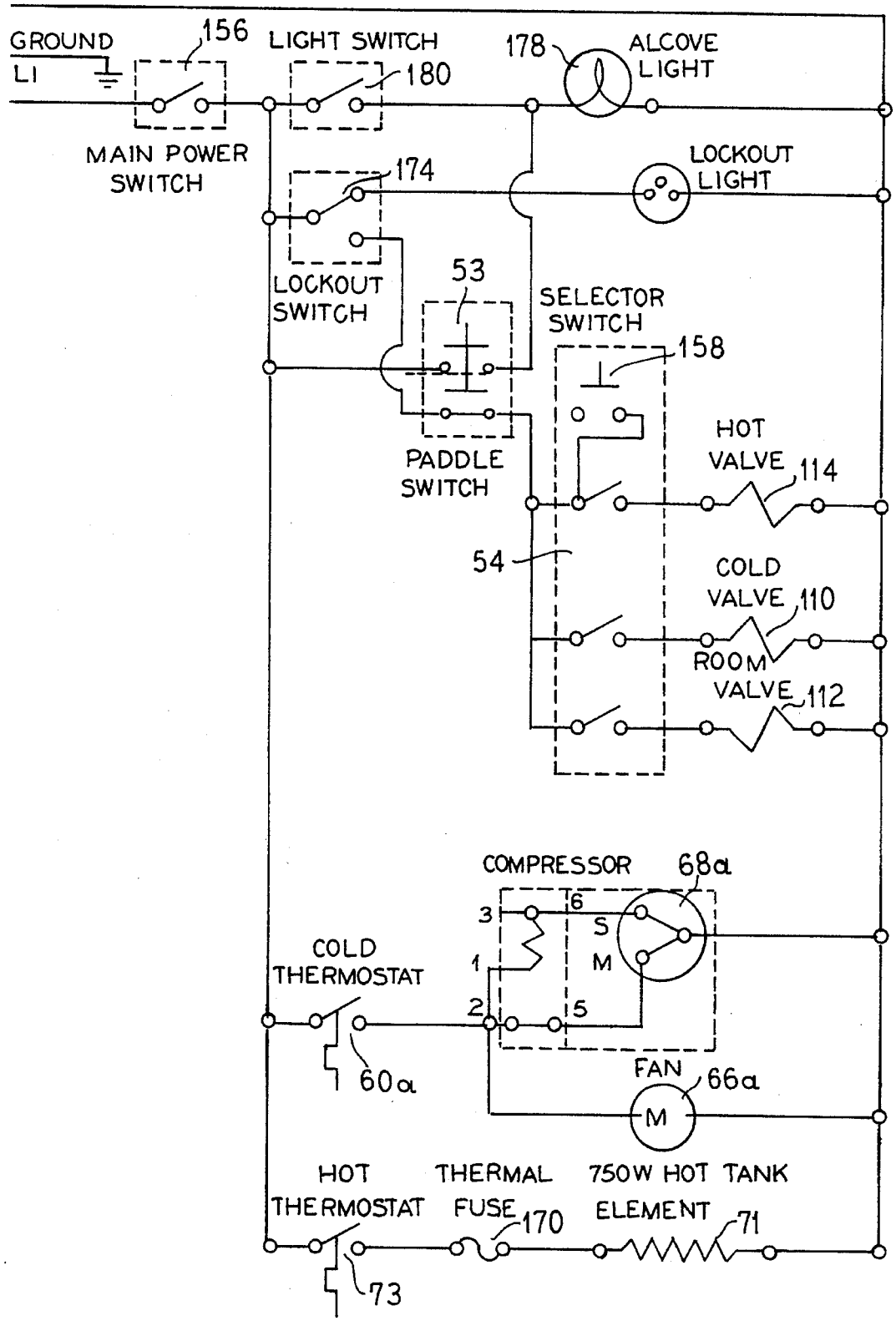
FIG. 14 is an electrical schematic of a control scheme of the apparatus of FIGS. 9–13.

FIG. 14 illustrates the control system for the apparatus of FIGS. 9–13. This schematic corresponds to the schematic of FIG. 6 in operation except that since no pump is needed for the filtered water systems, the electric circuit for the pump is eliminated as is the circuitry for the float switch for the reserve tank since no such reserve tank is not used in the filtered systems. The circuitry of FIG. 14 provides the lock out switch 174 in series with all of the solenoid valves 110, 112, 114 so that no water can be dispensed without deenergizing the lock out switch. Alternately, a control schematic corresponding to FIG. 5 (except for the deletion of the pump and reserve tank circuitry) could be provided which provides the hot lock out switch on the hot solenoid valve only which would require two handed operation of the paddle and the button for the lockout switch 158 to dispense hot water.

Figure 15:
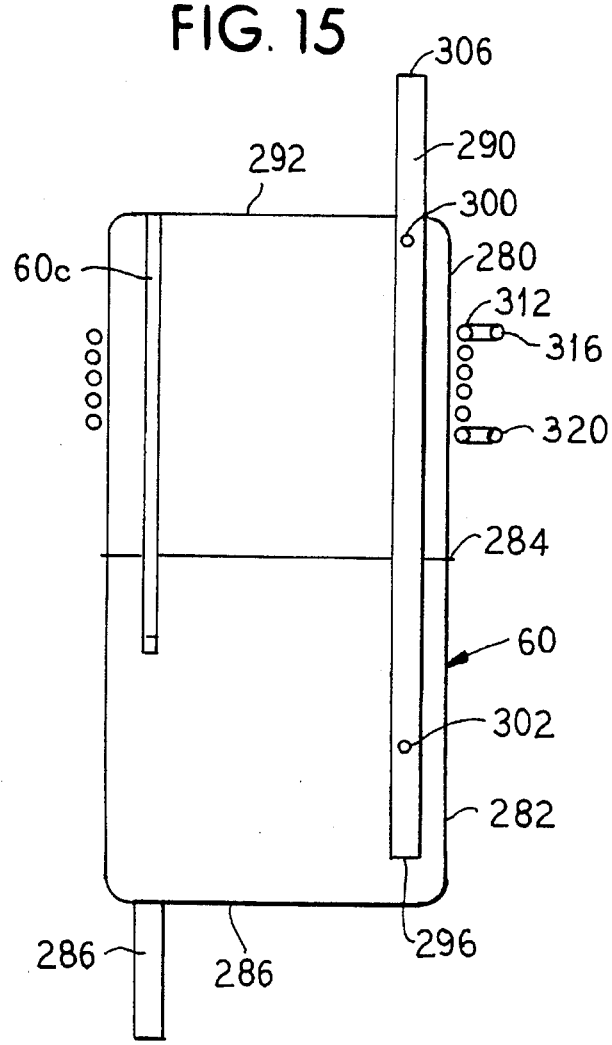
FIG. 15 is a longitudinal sectional view of a cold water tank of the present invention.

FIG. 15 illustrates an exemplary embodiment of the cold water tank 60 of the present invention. The tank is formed of a top shell 280 and a bottom shell 282 TIG welded along a flared seam 284. An inlet tube 286 is connected to a bottom 288 of the bottom shell 282 and would in operation be connected to the fourth tube 116 shown in FIG. 3. The inlet tube is offset from a longitudinal center line to allow for water mixing in the tank. Its location also prevents warmer inlet water from being driven directly out of the tank. The force of entering water enhances turbulence in the tank. The entering water flows to the top of the tank and causes cooler water at a bottom of the tank to be dispensed out of the tank.

An outlet pipe 290 is connected to a top 292 of the top shell 280 and extends into the interior of the tank to an open end 296 located approximately within 10mm of the bottom 286. In operation the outlet pipe 290 would be connected to the outlet tube 130 shown in FIG. 3. The outlet pipe 290 has two small vent holes 300, 302 (approximately 2mm diameter) located at equal distances from a top open end 306 and the bottom open end 296. Two holes are used to simplify manufacturing, the pipe 290 being therefore symmetrical, and reversible. The bottom vent hole 302 is not operable or significant after manufacture of the tank.

The top vent hole 300 allows air in the tank to be released as the tank is filled with water, i.e., air locks are prevented in the top of the tank during operation. The low open end 296 receives cold water from a bottom region of the tank for delivery out of the pipe 290.

The tank also provides the thermostat tube 60c extending approximately ⅔ into the tank. A thermostat lead 60b (not shown) is placed into the thermostat tube 60c to sense the water temperature. A refrigerant coil 312 is wrapped around an upper portion of the tank 60. This allows cooling of the upper, warmer water and better mixing and less temperature gradient in the system. The coil 312 provides an inlet 316 and an outlet 320.

Figure 16:
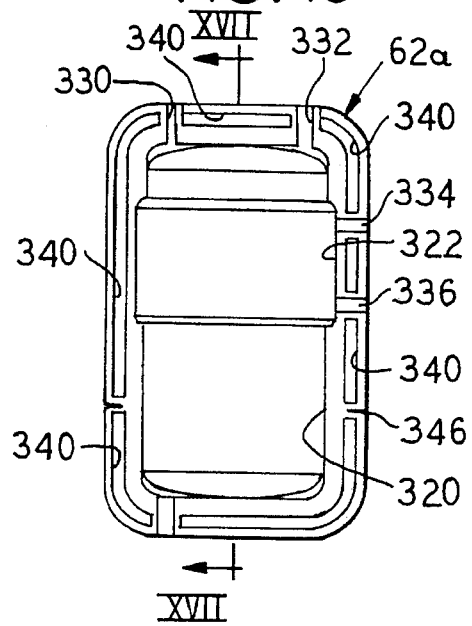
FIG. 16 is an elevational view of one of a mating section of insulation covers of the cold tank of FIG. 15.
Figure 17:
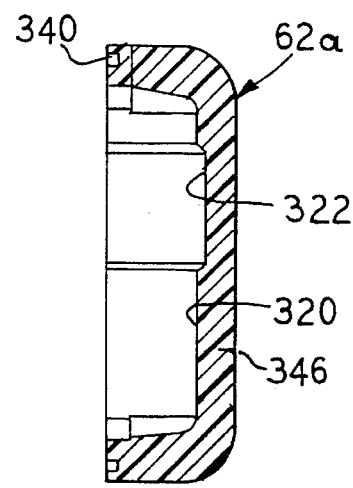
FIG. 17 is a sectional view taken generally along line XVII—XVII of FIG. 16.

FIGS. 16 and 17 illustrate one half section 62a of the insulation 62 of the tank 60. The insulation can be a hard foamed insulation having a generally cylindrical void 320 for the tank 60 and with an increased diameter void 322 for the coil 312. Recesses 330, 332, 334, 336 and 338 are provided which are semicircular for receiving the appurtenances such as the thermostat lead 60b (not shown), the outlet tube 290, the refrigerant inlet 316, the refrigerant outlet 320, and the inlet 286 respectively. The other insulation shell half (not shown) provides complementary recesses so that these appurtenances are closely surrounded by insulation when the two insulation shell halves are snapped together. The appurtenances and the respective recesses 330, 332, 334, 336, and 338 are advantageously aligned in a single parting plane of the insulation 62.

A discontinuous groove 340 is provided around a face of the shell half for allowing the two shell halves to snap together. The second shell half has a complementary surrounding tongue portion which completes a tongue and groove closure of the two shell halves.

Figure 18:
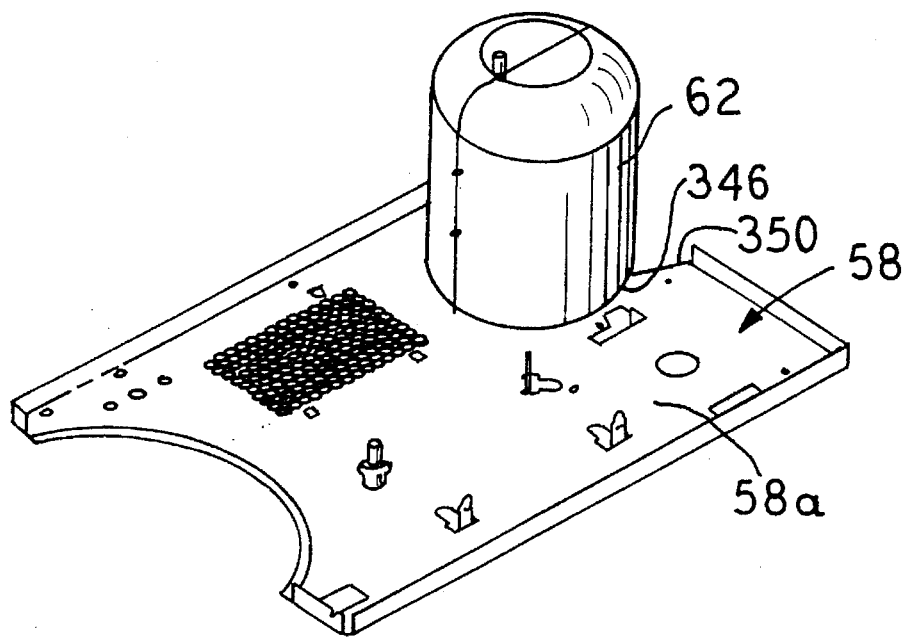
FIG. 18 is a perspective view of the cold water tank of FIG. 15 mounted to a refrigeration tray.
Figure 19:
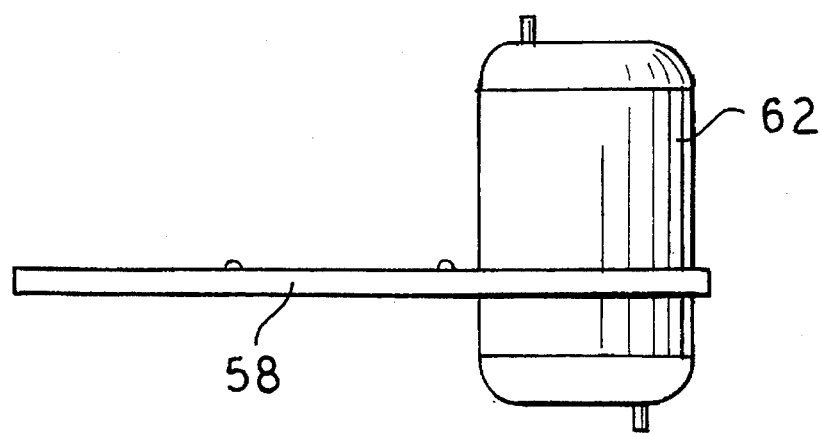
FIG. 19 is a side view of the arrangement of FIG. 18.

A surrounding slot 346 is formed or cut into an outside of the insulation. As shown in FIGS. 18 and 19, by forming the surrounding slot 346 into an outside of the insulation 62, the insulation and tank can be secured to and supported by the refrigeration tray simply by sliding the insulation 62 into a U-shaped notch 350 cut from the tray 58. A floor panel 58a of the tray 58 is thus gripped within the slot 346 around a partial circumference of the insulation. This provides an effective mounting of the tank which is readily manufactured and assembled and when installed does not add any extra significant source of conduction heat gain from the tray to the tank such as would a metallic bracket or lug directly contacting the tank.

As is apparent from the foregoing specification, the invention is susceptible of being embodied with various alternations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention is which an exclusive property or privilege is claimed are defined as follows:

1. A water dispensing apparatus for holding a water bottle and dispensing water therefrom, comprising:
    a tubular means adapted to be inserted into a water bottle for drawing water from the water bottle;
    a reserve tank flow connected to said tubular means for drawing water from the water bottle and having an elevated vent having a check vale located above a maximum water level in the water bottle;
    a dispensing spout arranged to dispense water into a container;
    a pump means for drawing water from said reserve tank and delivering water to said dispensing spout.

2. The apparatus according to clam 1, wherein said reserve tank further comprises a water level switch and said apparatus comprises an annunciator, said water level switch connected to said annunciator to indicate a low water level.

3. The apparatus according to claim 2 wherein said annunciator is a visual display.

4. The apparatus according to claim 1 further comprising a refrigeration means flow connected between said pump means and said dispensing spout for receiving water from said pump means, cooling said water, and delivering said water to said dispensing spout.

5. The apparatus according to claim 1 further comprising a hot water means flow connected between said pump means and said dispensing spout, for receiving water from said pump means, heating said water, and delivering said water to said dispensing spout.

6. The apparatus according to claim 1 further comprising a cold water solenoid valve, a hot water solenoid valve, a means for refrigerating water, a means for heating water, and a valve manifold, said valve manifold flow connected to an outlet of said pump means, said valve manifold connected to said cold water solenoid valve and said hot water solenoid valve;
    said cold water solenoid valve flow connected to said means for refrigerating water and said hot water solenoid valve flow connected to said means for heating water, said means for refrigerating water and said means for heating water flow connected to said dispensing spout; and
    a selector means for selectively opening said cold water solenoid valve or said hot water solenoid valve to select hot or cold water at said dispensing spout.

7. The apparatus according to claim 6 further comprising a lock out switch activated by a user and connected to said hot water solenoid valve, to prevent energizing of said hot water solenoid valve by said selector means.

8. The apparatus according to claim 6, wherein said valve manifold further comprises an auxiliary port for flow connecting said apparatus to a remote user of bottled water.

9. The apparatus according to claim 6, wherein said means for refrigerating water comprises:
    a cold water tank having a refrigerant coil arranged in heat transfer therewith;
    a compressor flow connected to said refrigerant coil;
    a condenser flow connected to said compressor and said evaporator, said condenser comprising coils and a convection fan for blowing room air across said coils.

10. The apparatus according to claim 9, comprising a cabinet having a base for holding the water bottle and wherein said condenser, said cold water tank and said compressor are mounted on a refrigeration tray located above the water bottle.

11. The apparatus according to claim 10, wherein said means for heating water comprises a hot water tank having a heating element therein and said hot water tank is hung from said refrigeration tray; and said pump means and said reserve tank are mounted behind the water bottle on said base.

12. An apparatus for dispensing water comprising:
    a cabinet having an enclosed bottom compartment accessible through a front mounted door, a top compartment above said bottom compartment said top compartment having an alcove on a front side thereof;
    a water dispensing spout mounted to said cabinet within said alcove;
    a water conduit means for channeling water arranged between said bottom and top compartments;
    a means for chilling water mounted within said top compartment and flow connected to said spout and to said water conduit means;
    clean water supply means including one of a bottled water supply or a filter assembly located within said bottom compartment and flow connected to said water conduit means, said bottom compartment sized and adapted to contain said water supply means; and wherein said means for chilling water comprises a cold water storage tank having an inlet on a bottom thereof and an outlet tube extending from a top thereof into an interior of the tank to an open end adjacent a bottom of the tank.

13. The apparatus according to claim 12, wherein said outlet tube comprises a vent hole through a side wall thereof, located within said tank adjacent a top thereof.

14. The apparatus according to claim 12, further comprising a two piece rigid insulation shell for surrounding said cold water storage tank, said shell having a tongue and groove locking arrangement between pieces to allow installation around the tank and a mounting groove on an outside thereof; and said cabinet comprises a tray separating said top and bottom compartments, said tray having a notch for receiving said mounting groove for securing said insulation shell to said tray.

15. The apparatus according to claim 12, further comprising a hot water tank having means for heating water held therein, and a selector panel with a selector button electrically connected to a selector switch means, said selector button for activating the selector switch means for dispensing hot water from said hot water tank, and an electrical lock out switch electrically connected to said selector switch means for preventing inadvertent dispensing of hot water.

16. The apparatus according to claim 15, wherein said selector switch means and said lock out switch are electrically wired in series.

\* \* \* \* \*